May 16, 1967  H. A. McANINCH ET AL  3,319,907
BELT RETRACTING MEANS
Filed Jan. 10, 1964　　　　　　　　　　　　　2 Sheets-Sheet 1
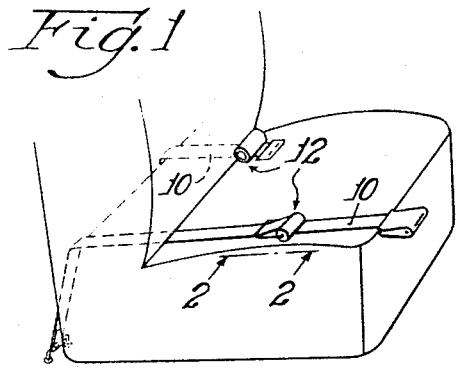
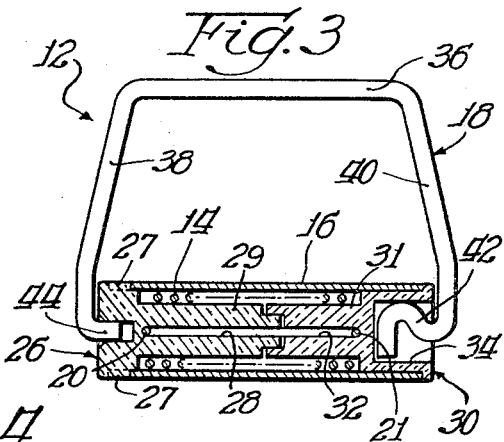
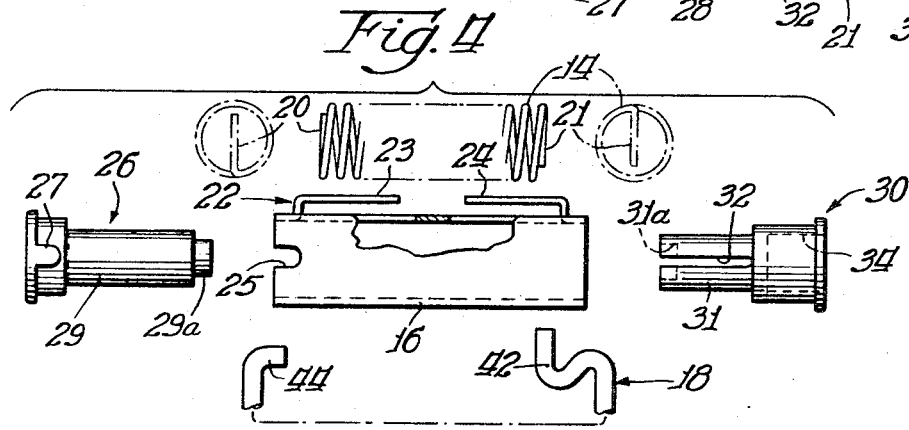
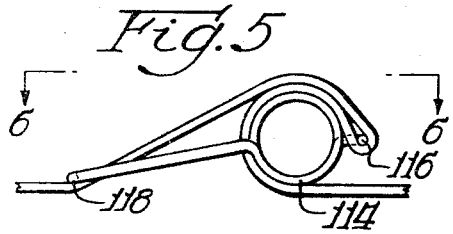
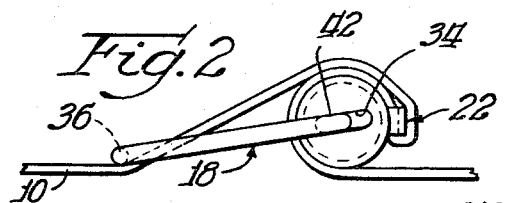
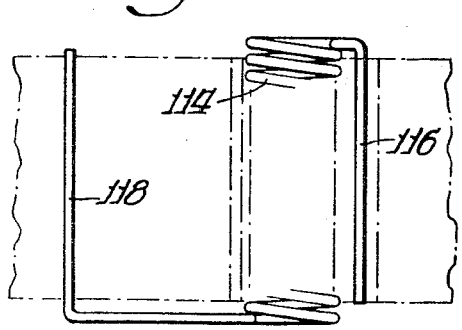
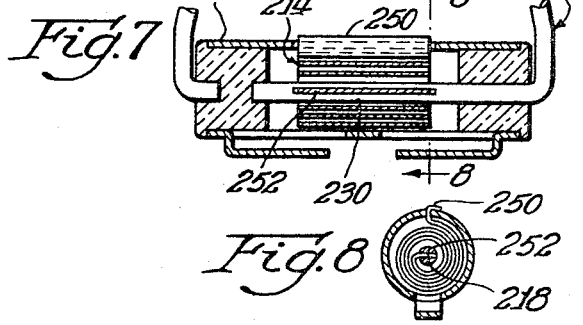
Inventors:
Herbert A. McAninch
and Hugo W. Velander
By Lyle S. Morley Atty.

May 16, 1967  H. A. McANINCH ET AL  3,319,907
BELT RETRACTING MEANS
Filed Jan. 10, 1964  2 Sheets-Sheet 2
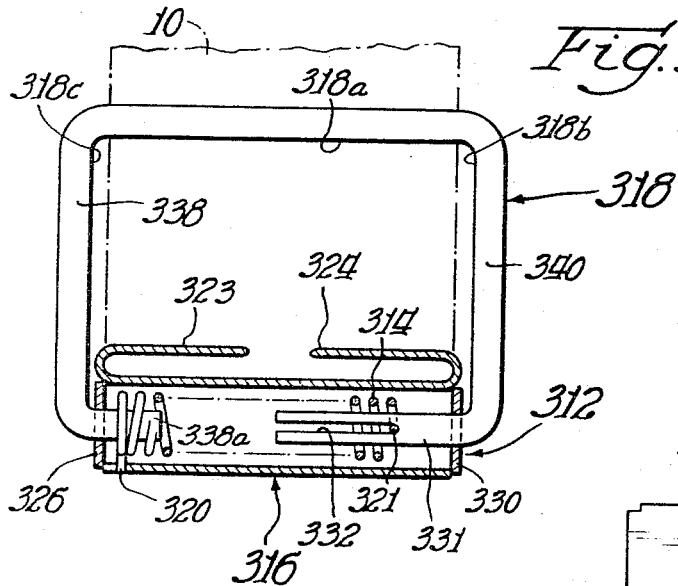
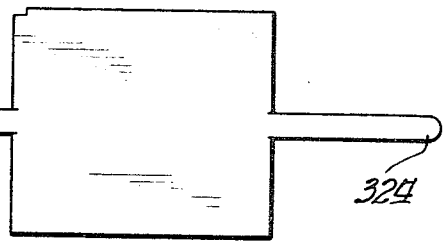
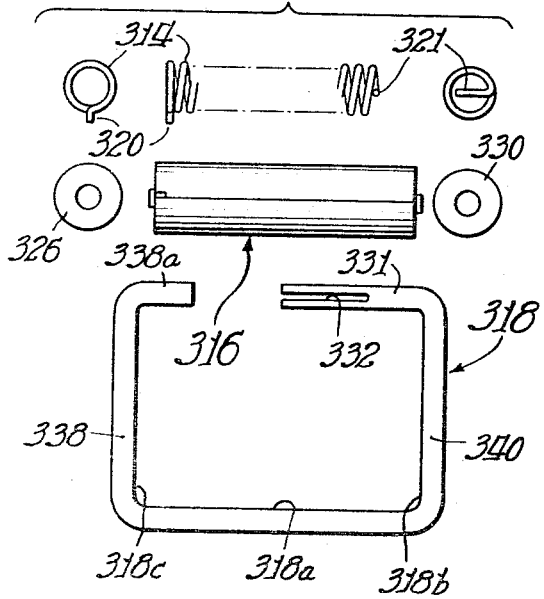
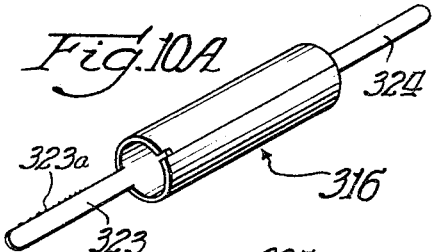
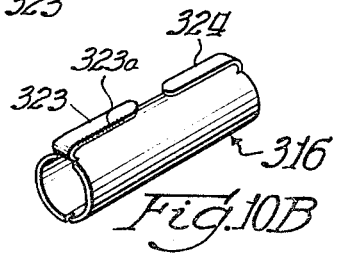
Inventors:
Herbert A. McAninch
and Hugo W. Velander
By: Lyle S. Motley  Atty.

United States Patent Office 3,319,907
Patented May 16, 1967

3,319,907
BELT RETRACTING MEANS
Herbert Austin McAninch, Auburn, Ind., and Hugo W. Velander, Cary, Ill., assignors to Borg-Warner Corporation, Chicago, Ill., a corporation of Illinois
Filed Jan. 10, 1964, Ser. No. 336,896
5 Claims. (Cl. 242—107.11)

This is a continuation-in-part of original joint patent application of Herbert A. McAninch and Hugo W. Velander, S.N. 274,271, filed Apr. 19, 1963.

This invention relates to a belt take-up or retracting means and particularly such means for use in conjunction with safety belts in vehicles such as automobiles or aircraft.

One of the difficulties with presently known automobile seat belts, for example, is that when not in use the belt portions lie on the seat or become somewhat inaccessible when they slip between or behind the seats. While there have been inventions directed towards alleviating this problem, generally they have been cumbersome structures which are often complicated and expensive to manufacture. Some of these prior art belt take-up devices require, for example, a container device for each belt section, containing a reel or similar mechanism upon which the belt is reeled. In addition, some of these devices present special installation problems in that they require attachment to the flooring of the vehicle or the seat structure itself.

It is a principal object of this invention to provide a belt take-up means which is simple in structure, easy to manufacture and is inexpensive.

Another object is to provide a device which can be easily attached to belts which are already installed in automobiles, aircraft or any other pieces of equipment where such belts are used.

Another object is to provide a simple belt take-up means which has no relation to or connection with the belt anchoring means and may be attached to the belt at any desired position and subsequently adjusted to any desired position.

Another object is to provide a belt take-up means comprising a construction which rolls up the belt from both sides of the take-up means in a double layered formation thus effectively reducing the tension necessary in the energy storing means by reducing the effective length of the belt to be rolled up to substantially one-half its full length.

The foregoing and other objects and advantages of the present invention become apparent in the following detailed description thereof of when read in conjunction with the accompanying drawings wherein:

FIGURE 1 is a perspective view of a seat equipped with seat belts and showing one belt section in extended position and another section in retracted position;

FIGURE 2 is a view taken along line 2—2 of FIGURE 1;

FIGURE 3 is an assembly drawing partially in section of a preferred form of the belt take-up device;

FIGURE 4 is an exploded view of the parts of the belt take-up device;

FIGURES 5 and 6 show another embodiment of a take-up means incorporating the same general concept of the preferred embodiment;

FIGURE 7 illustrates another embodiment utilizing a flat helical spring;

FIGURE 8 is a view taken along line 8—8 of FIGURE 7;

FIGURE 9 is a view corresponding to FIGURE 3, but showing the preferred modified form of the present invention;

FIGURE 9A is an exploded view corresponding to FIGURE 4 but showing the preferred modified form of FIGURE 9; and FIGURES 10, 10A and 10B disclose successive steps in the fabrication of the reel proper of FIGURES 9 and 9A.

Referring now to FIGURE 1, there is illustrated generally two seat belt sections or lengths 10 in attached position on a seat and belt take-up or retraction means 12 attached at approximately the midpoint of each seat belt section. One section is shown in extended position and the other is shown in retracted position. It is noted that two take-up means would normally be used in conjunction with a complete seat belt.

Our invention comprises an independent belt retraction device which may be easily attached to a belt means. In its broadest aspects it comprises an energy storing means, a reaction member attached to the energy storing means for taking a reaction from the belt to which the device is attached and another member attached to the energy storing means upon which the belt may be reeled or wound.

A preferred embodiment of the belt take-up means 12 is shown in FIGURE 3. The take-up or retraction means comprises an energy storing means 14 illustrated here as a coil spring, a tubular reel member 16 for housing the spring and on which the belt is wound, and a reaction member 18 in the form of a bracket effectively connected at one end of the energy storing means 14 and at the other to the tubular member 16.

The spring in this example is formed with connecting means 20 and 21 in the form of radially inwardly extending spring end portions at each end to effectively connect the spring at one end to the tubular member 16 and at the other end to the reaction yoke member 18. An alternative energy storing means would be, for example, a flat helical spring as illustrated in FIGURE 7.

The tubular housing member 16 may be formed from a flat stamping which is then formed into a tubular design. The member 16 has formed thereon belt attaching or anchoring means in the form of a yoke 22 for attaching the belt section 10 to said reel. The yoke 22 may be formed as an integral part of the member 16 by stamping the arms 23 and 24 from the metal blank used to make the tubular member 16. It will be observed that a flexible belt may be easily slipped into the yoke 22 which is open at the middle portion thereof. This construction is particularly advantageous where the device is to be used on seat belts which are already installed. The yoke 22 could be a solid member, i.e., not open at the middle, and would then be more applicable to belts yet to be installed. In either case, the belt take-up means can be easily positioned at any desired position on the belt.

An end cap 26 is inserted into the left end of the tubular housing member 16 as viewed in FIGURE 3. A pair of diametrically opposed axially extending bosses 27 are formed on the left end of the cap 26. These bosses are received by slots 25 in the end of the housing member 16. Formed at the inner end of the end cap 26 is a slot 28 for receiving the connection means 20 formed at the left end of the spring means 14 as viewed in FIGURE 4. The inner end portion 29 of the end cap 26 is of a smaller diameter than the internal diameter of the member 16. Since the end cap 26 is not rotatably movable with respect to the tubular member 16, the spring 14 is in effect attached to the tubular member at this end.

Inserted into the other end of the tubular member 16 is a second end cap means 30. This end cap 30 is formed with a slot 32 at its inner end for connection to the other end of the spring means by the connecting means 21. At its outer end the end cap 30 has formed therein a slot or recess 34 for receiving a bent end portion of the reaction yoke member 18. The inner end portion 31 of the end cap means 30 is of substantially the same diameter as the inner end portion 29 of end cap 26. The diameter of the two portions 29 and 31 is effective to control the tension that may be put on the spring 14. The end caps 26 and 30 may be made of plastic or metal as desired.

The end caps 26 and 30 also have formed at the inner ends thereof respectively a complementary boss 29a and recess 31a which structure helps to keep the spring 14 centered in the assembly during the operation of the device.

The reaction member 18 in this preferred embodiment is in the form of a bail or three-sided bracket which is formed with a central belt engageable guide bar or arm portion 36 providing a slide surface and two side bar portions 38 and 40. One end of the side bar portion 40 has formed thereon a bent S-portion 42 which is adapted to be received in the slot 34 of end cap 30. This is one manner of connecting the reaction member 18 to the end cap 30 so that these two members will not be rotatably movable relative to each other in an assembled condition. The connection is such that in an assembled condition the reaction member 18 is effectively connected to the right end of the spring 14 as viewed in FIGURE 4. The other side bar portion 38 has formed thereon a bent end 44 which is adapted to be received in the outer end of the end cap 26.

Where a split yoke 22 is used, a spring biased safety closure device may be used, if desired. Such a device may comprise, for example, tubular latch means adapted to fit over the ends of the arms 23 and 24 and spring means for urging the latch into closed position.

In order to attach the belt take-up means to the belt, the tubular member 16 with the spring attached is rotated counter-clockwise with respect to the reaction member 18 as viewed in FIGURE 2. This puts tension on the spring 14. It is then clipped to the belt section 10 approximately at the midpoint of the belt section in its extended position as viewed in FIGURE 1. The tubular member 16 is so connected to the belt that the bar portion 36 of the reaction member 18 lies on top of the belt as viewed in FIGURE 2. As the tension on the belt is relaxed by the person using it the tension on the spring is released, thus tending to turn the tubular member as viewed in FIGURE 2 in a clockwise direction. This winds the belt onto the tubular member 16 in a double layer. Thus the spring need only be of such size and have such force as to be able to accommodate or as to be able to reel up essentially half a belt length 10. It will be noted from FIGURE 1 that when the belt is not in use and is in a retracted position, the belt take-up means rests snugly at the intersection of the seat and back portion of the seat.

It will be noted that the device illustrated as the preferred embodiment is made up of parts which may be easily assembled, none of the parts being permanently fastened to each other. For example, in viewing FIGURE 3 it is seen that the end cap 26 is easily removed from the tubular member 16 by pulling the side bar portion 38 out of the end cap 26. The end cap 30 also slidingly fits into the tubular member 16 and may be removed therefrom. The spring member 14 may be tensioned slightly to decrease the diameter and is then easily removable from the tubular member 16. Thus it becomes apparent that this is a device which can be sold, for example, as an unassembled kit or in the alternative as an assembled unit. The unit may be attached to seat belts which are already in position in a variety of vehicles such as automobiles or aircraft. Such ease of assembly makes replacement of parts a simple matter.

A more simplified embodiment incorporating the general concept embodied in our invention is illustrated in FIGURES 5 and 6.

For example, in FIGURE 6 there is illustrated a one piece unit comprising an energy storing member in the form, for example, of a coiled torsion spring 114 with a reeling or winding bar 116 attached at one end thereof and a reaction bar 118 attached at the other end of the spring 114.

The embodiment illustrated in FIGURE 7 also incorporates the general concept embodied in our invention. In this embodiment the energy storing means is in the form of a flat helical spring 214 which has the outer end 250 connected to the tubular member 216 and the inner end 252 connected to the reaction member 218 through the medium of a slot 230.

Thus we have advantageously provided a device which may be attached to any existing seat belt installation as well as to seat belts as originally sold. Our device also makes it unnecessary to modify the belt attachment structure, that is, the structures used to attach the seat belts to either the vehicle frame or to the seat itself. In addition it will be observed that this device is independent of the attachment structure and, therefore, has no effect on the belt tension, that is, on the hold or pull taken by the belt in response to movement of a person using the belt. When the belt is completely extended, all pull on the belt is taken directly by the belt anchoring means and the belt take-up device carries none of the tension load. Also the particular type of arrangement requires only that the energy storing means be effective to roll up half a belt length rather than a full portion of the belt length or section. In addition, this belt take-up means is very inexpensive and easy to manufacture.

Reference will now be made more specifically to the continuation-in-part subject matter incorporated in the preferred modification disclosed in FIGURES 9 and 9A. In this modification, the tabs or tangs 323 and 324 are located on the periphery of the reel and are particularly characterized by being formed as an integral part of the tubular reel itself, as will be made more apparent. This modification of tubular reel indicated generally at 316 may be provided quite readily as a stamping from a sheet of metal to form a reel blank and tabs 323 and 324 simultaneously, all as shown more spefically in FIGURES 10, 10A and 10B. One of the problems that has been found to present itself is the existence of sharp burrs 323a resulting from the stamping operation and the difficulty of removing these burrs in the subsequent tumbling operation normally employed for this purpose. By forming the tabs 323 and 324 integral with the blank later to become reel 316, this removal of the burrs by tumbling is much simplified. As is well known, the burrs occur on the side of the blank where the die leaves the blank. Hence, it becomes a relatively simple matter to choose the manner of rolling up reel 316 as indicated in FIGURE 10A so that the burrs remain on the edges of the tabs facing the reader in FIGURE 10A. Then, when the tabs are turned over, as indicated in FIGURE 10B, the burrs will lie on the top edges of the tabs 323 and 324 with the result that upon subjecting the reel to the usual tumbling operation, these burrs are readily removable. This removal of the burrs is important since the failure to accomplish this will result in the burrs digging into the safety belt and destroying the fabric thereof, with consequent shortening of the life of the unit.

Another advantage of forming the tabs 323 and 324 as an integral part of the tubular reel 316 is the fact that the width capacity thereof can be made substantially as great as the overall coaxial dimension of the reel, with the result that the radial arms 338, 340 of the reaction bail may be made parallel or substantially parallel to each other, thus simplifying the formation of the bail and improving the guiding function of guide surfaces 318a, 318b and 318c. It wil be recalled from the description of the structure of FIGURE 3, that where the tabs 23 and 24 are struck or stamped from internally of the periphery of the blank, certain additional length of reel is required beyond the base of the respective tabs, with the results that the reel is necessarily slightly longer than the maximum width of the belt receivable between tabs 23 and 24.

and bail arms 38 and 40 must therefore be made to converge in the direction of reaction arm 36 of the bail. The present proposal avoids this necessity of convergence of the arms and the resulting parallel guide surfaces 318b, 318c do an effective job of guiding the opposed edges of the belt 10.

Referring now in still more detail to the modification of FIGURES 9 and 9A, it will be seen that the retractor device indicated generally at 312 differs in certain additional important respects from that described in connection with FIGURES 1 through 4.

The radially inner terminal of bail or hinge arm 340 is provided with a coaxially inwardly extending portion 331 which in turn is formed with a coaxial slot or groove 332. The outer diametrically extending terminal 321 of elongated helical coil spring 314 is received in slot or groove 332. This facilitates assembly and provides for a reliable connection between the reaction bail 318 and the torsion spring. This is common to the modification of FIGURE 3 and is claimed in its broad concept in this application. The opposite terminal 320 of the torsion spring 314 may be passed through a radial opening in the tubular reel 316 for fastening thereto as indicated. Closure members in the form of washers 326 and 330 may be employed for cooperation with the coaxially extending journal and connecting members 331 and 338a.

The claims in this partial continuation application are directed particularly to the unique arrangement of split fastening yoke extending beyond the periphery of the tubular reel and carried thereby, making it feasible for the ready insertion of the belt as the side thereof and making it unnecessary to disconnect the belt from its anchorage on the vehicle in order to install the retractor mechanism. Also forming part of the subject matter claimed in this application is the unique manner of providing a split yoke construction. In addition, there is claimed the provision of means containing the coaxial guiding slot for facilitating the assembly of the spring.

In the above original case there is claimed the unique broad subject matter including the combination of the elongated tubular reel, the helical coil spring contained within the reel, and a fastening yoke broadly carried at the periphery of the reel for ataching the belt at the bight portion thereof intermediate its ends.

The more specific unique structural features shown in FIGURES 1 through 4 are covered in a companion case in the names of E. A. Ferris and Stephen Zanoni S.N. 337,430.

While a certain preferred embodiment of the invention has been specifically disclosed, it is understood that the invention is not limited thereto as a number of variations will be readily apparent to those skilled in the art and the invention is to be given its broadest possible interpretation within the scope of the following claims.

We claim:

1. A self-contained resilient retractor device for vehicle safety belts of the type having a substantial width relative to the thickness thereof, said device comprising means defining an elongated hollow tubular reel upon which the flat surface of a belt of substantially coextensive width is adapted to be received in double spiral coiled relation, means defining an attaching anchor extending radially from the outer periphery of said reel and adapted to connect with a bight portion of said belt located between and spaced from the ends thereof, said anchor being formed as an integral part of said tubular reel, said attaching anchor being particularly characterized by being in the form of a pair of axially inwardly extending tabs struck from the same sheet as that from which the tubular reel is formed, said tabs extending from the opposite terminal portions of said tubular reel generally parallel with the axis of said reel and spaced from the outer periphery of said reel, the inner terminals thereof being spaced apart and facing each other to define an opening effective to facilitate the introduction of the sides of the belt through said opening and between said tabs and the outer periphery of said reel, and means defining a single reaction bail in respect to which the said reel is rotatably mounted, said reaction bail having a contact slide surface substantially spaced from the axis of rotation of the reel and having a length substantially the same as both the width of the belt and the axial dimension of said reel, and arranged for sliding contact along the flat face surface of the belt, and an elongated torsion coil spring positioned within said tubular reel and having one terminal thereof in anchored relation to said reel and the other terminal thereof anchored with reference to said reaction bail, whereby upon the connection of said reel anchor to the bight portion of said belt and the pretensioning of said torsion spring, the belt will be rolled into double ply, superimposed spiral coils upon said reel, during the sliding of said contact surface of the reaction bail along the flat face surface of the belt.

2. A self-contained resilient take-up unit for vehicle passenger safety belts of the type having substantial width relative to the thickness thereof, said unit comprising means defining an elongated tubular reel of a length substantially the same as the width of the safety belt and of a diameter only a small fraction of the axial length of said reel, said reel being adapted to receive the flat surface of a safety belt in spiral coiled relation thereon, means formed as an integral part of and extending radially outwardly beyond the periphery of said tubular reel a distance substantially the thickness of the belt and extending transversely of the belt in embracing relation of a substantial portion of said belt for attaching the belt to said tubular reel at the bight portion of the belt intermediate of and spaced from the ends of the belt, said attaching means being particularly characterized by the inclusion of means providing for the ready insertion of the belt at the sides thereof and under said attaching means, thus making it unnecessary to thread the end of the belt into fastening position, means defining a reaction member in respect to which the reel is rotatably mounted, said reaction member having a contact slide surface substantially spaced from the axis of rotation of the reel and of a length substantially the same as the width of the belt, and arranged for sliding contact along the flat face surface of the belt, and an elongated helical coil spring positioned within said tubular reel, means anchoring one end of said spring to said tubular reel and means anchoring the other end of said spring to said reaction member, whereby upon the connection of said belt attaching means to the belt bight portion and the pretensioning of said spring, the belt will be received into double ply, superimposed spiral coils upon said reel during the sliding of the contact slide surface of said reaction member along the flat face surface of the belt.

3. In a retractable safety seat belt device for a belt of the flat surface type having a substantial width relative to the thickness thereof, and adapted to have one end anchored to a vehicle and the other end placed about a passenger, said device comprising means defining an elongated hollow tubular reel having an axial length substantially the same as the width of said belt and a diameter only a small fraction of the length thereof, said tubular reel being adapted to receive the flat surface of a safety belt in double spiral coiled relation thereon; attaching means for said belt intermediate the ends thereof, said attaching means extending radially outwardly from the periphery of said reel and having a belt engageable underportion in outwardly spaced relation to the outer periphery of said reel, formed as an integral part of said tubular reel and providing an opening for the introduction of the belt from the side thereof; means defining a bar-like reaction bail in respect to which the said reel is rotatably mounted, said reaction bail having a contact guide surface substantially spaced from the axis of rotation of said reel and of a length substantially the same as the width of the belt, and arranged for guiding contact along the flat surface of the belt transversely thereof; and an elongated helical coil torsion spring confined within said tubular reel and extending coaxially thereof, one end of said spring being connected in driving relation to said reel adjacent a first terminal of said reel and the other end of said spring being anchored in relation to said reaction bail adjacent the other terminal of said reel; whereby when the belt is completely withdrawn from the reel and in functional position about a passenger, the pull is directly through the belt to the vehicle anchorage and the retractor device floats on the belt without being subject to the force of impact imposed upon the belt by the passenger.

4. In a self-contained resilient take-up reel unit for vehicle passenger safety seat belts of the type having substantial width relative to the thickness thereof effective to distribute the weight thrust of a passenger body thereagainst, said unit comprising means defining a sheet metal elongated hollow tubular reel upon which the flat surface of said seat belt is adapted to be received in double spiral coiled relation, belt attaching means formed integral with said sheet metal reel, said attaching means extending radially outwardly from the periphery of said reel member for connection with the bight portion of the belt at a position intermediate of and spaced from the ends of said belt, said attaching means being further characterized by being constructed in the form of tabs struck from the body of said metal reel integral therewith and extending axially from the opposite terminal portions of said reel in outwardly spaced relation to said reel with the juxtaposed inner terminals of said tabs spaced apart to provide for the ready introduction of the sides of the belt thereunder; means defining a belt reaction guide member in respect to which the reel is rotatably and supportedly mounted, said reaction member being provided with a contact slide and guide surface substantially spaced from the axis of rotation of the reel and of a length substantially the same as the width of the belt and arranged for sliding contact along the face of the belt, said reaction member further including a first and a second radially inwardly extending arm; an elongated helical coil torsion spring confined within said tubular reel, means for connecting a first end of said spring at a first terminal portion thereof in driving relation with said reel adjacent a first end of said reel and means for rotatably supporting the ends of said reel with reference to said respective radially inwardly extending arms of said reaction member, said supporting means including at least one coaxially inwardly extending cylindrical member received within one end of said reel and receiving a second terminal portion of said spring in embracing relation thereabout, and means placing the adjacent second end of said spring in reactive relation to one of said radially inwardly extending arms, said last named means including means defining a coaxially extending open ended slot in said cylindrical member for the ready reception of said second named end of said torsion spring, whereby upon the connection of said reel attaching means to the bight portion of said belt, and the pretensioning of said torsion spring, said belt will be rolled into double ply, superimposed spiral coils upon said reel during the sliding of said contact surface of said reaction guide member along the flat face surface of the belt.

5. In a retractable safety belt device for a belt of the flat surface type having a substantial width relative to the thickness thereof, and adapted to have one end anchored to a vehicle and the other end placed about a passenger, said device comprising means defining an elongated hollow tubular reel having an axial length substantially the same as the width of said belt and a diameter only a small fraction of the length thereof, said tubular reel being adapted to receive the flat surface of a safety belt in double spiral coiled relation thereon; attaching means for said belt intermediate the ends thereof, said attaching means extending radially outward from the periphery of said reel and having a belt engageable underportion in outwardly spaced relation to the outer periphery of said reel, formed as a part of said tubular reel and providing an opening for the introduction of the belt from the side thereof; means defining a bar-like reaction bail in respect thereto to which the said reel is rotatably mounted, said reaction bail having a contact guide surface substantially spaced from the axis of rotation of said reel and of a length substantially the same as the width of the belt, and arranged for guiding contact along the flat surface of the belt transversely thereof; and an elongated helical coil torsion spring confined within said tubular reel and extending coaxially thereof, one end of said spring being connected in driving relation to said reel adjacent a first terminal of said reel and the other end of said spring being anchored in relation to said reaction bail adjacent the other terminal of said reel; whereby when the belt is completely withdrawn from the reel and in functional position about a passenger, the pull is directly through the belt to the vehicle anchorage and the reactor unit floats on the belt without being subject to the force of impact imposed upon the belt by the passenger.

References Cited by the Examiner

UNITED STATES PATENTS

| | | | |
|---|---|---|---|
| 601,930 | 4/1898 | Bell | 242—107.12 |
| 752,558 | 2/1904 | Hynson | 242—74 |
| 1,313,644 | 8/1919 | Simon | 224—4 |
| 1,825,044 | 9/1931 | Baxenden et al. | 242—74 |
| 2,037,324 | 4/1936 | Heusinkveld | 242—107.11 |
| 2,343,980 | 3/1944 | Keene | 242—74 |
| 2,541,476 | 2/1951 | Mihalyi | 242—71.1 |

FOREIGN PATENTS

| | | |
|---|---|---|
| 722,801 | 1/1932 | France. |
| 501,543 | 7/1930 | Germany. |
| 680,850 | 9/1939 | Germany. |

FRANK B. SHERRY, *Primary Examiner.*

R. B. FARLEY, C. A. NUNBERG, *Examiners.*